United States Patent [19]

Auspurg et al.

[11] 4,044,333
[45] Aug. 23, 1977

[54] DATA PROCESSING SWITCHING SYSTEM

[75] Inventors: Heinz Auspurg, Gauting; Josef Huber, Munich, both of Germany

[73] Assignee: Siemens Aktiengesellschaft, Munich, Germany

[21] Appl. No.: 550,610

[22] Filed: Feb. 18, 1975

Related U.S. Application Data

[63] Continuation of Ser. No. 377,129, July 6, 1973.

[30] Foreign Application Priority Data

July 26, 1972 Germany .......................... 2236718

[51] Int. Cl.² ........................................... G06F 13/00
[52] U.S. Cl. ................................................. 364/200
[58] Field of Search ......................... 340/172.5; 445/1

[56] References Cited

U.S. PATENT DOCUMENTS

| | | | |
|---|---|---|---|
| 3,274,561 | 9/1966 | Hallman et al. | 340/172.5 |
| 3,349,375 | 10/1967 | Seeber et al. | 340/172.5 |
| 3,478,321 | 11/1969 | Cooper et al. | 340/172.5 |
| 3,491,339 | 1/1970 | Schramel et al. | 340/172.5 |
| 3,503,048 | 3/1970 | Avsan et al. | 340/172.5 |
| 3,676,861 | 7/1972 | Ruth | 340/172.5 |

*Primary Examiner*—Harvey E. Springborn
*Attorney, Agent, or Firm*—Schuyler, Birch, Swindler, McKie & Beckett

[57] ABSTRACT

A data processing switching system is disclosed including system units comprising processing units and memory banks and at least one storage input/output control governing the information traffic between the processing units and the memory banks via communication channels. The system contains an input control and an output control establishing links for the traffic. A plurality of communication paths for the information traffic is governed by these controls, the controls being characterized by means for grouping the processing units (VE) and the memory banks (SB) into a plurality of groups in number equal to the number of the communication paths currently available for seizure between the processing units and the memory banks or between the memory banks and the processing units. The processing units and memory banks include means for sending input or output requests to said input or output control, respectively.

The input and output control includes means for evaluating these requests as a function of the priority of the sending system unit, and for comparing these requests on the basis of their respective destinations.

Means are provided responsive to these evaluating means for concurrently connecting at least one of the processing units requesting an input and at least one of the memory banks requesting an output to their respective destinations over the respective input or output circuit of the control means.

13 Claims, 4 Drawing Figures

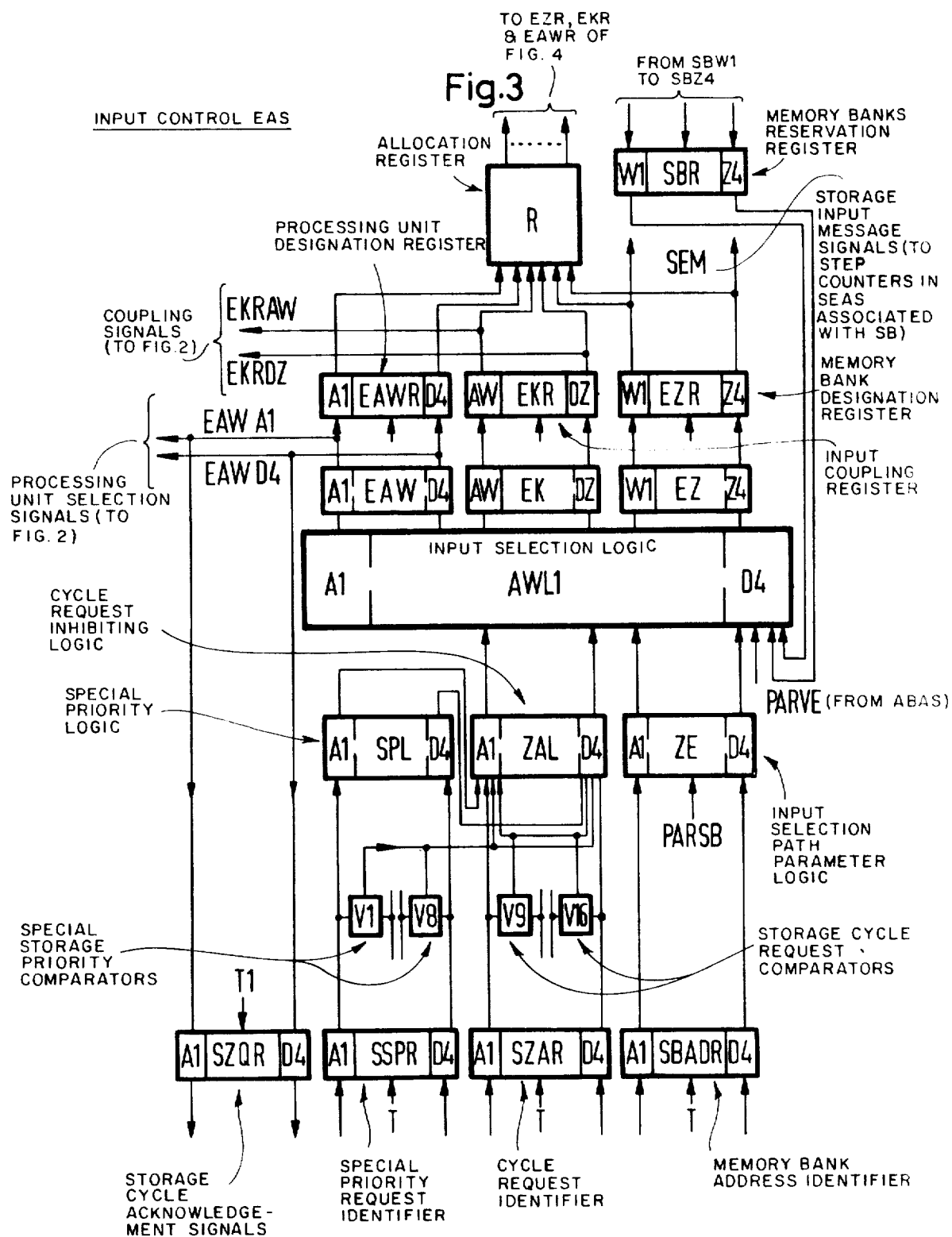

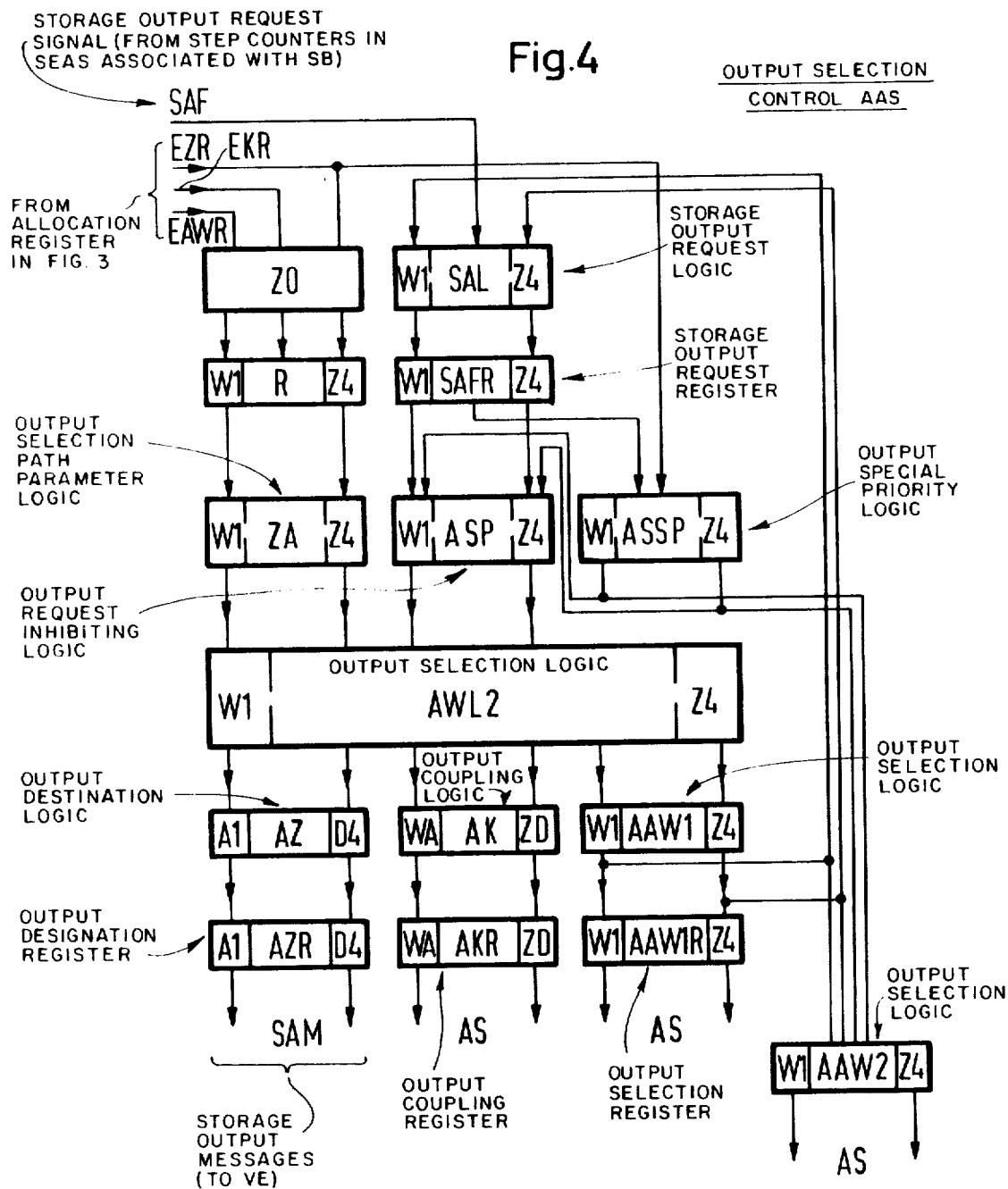

DATA PROCESSING SWITCHING SYSTEM

This is a continuation of application Ser. No. 377,129 filed July 6, 1973.

BACKGROUND OF THE INVENTION

The invention relates to a program-controlled data processor, more particularly a data switching system using a plurality of processing units and a plurality of memory banks and at least one storage input/output control governing the traffic between the processing units and the memory banks via communication channels and containing an input and output circuit for the information as well as an input and output control establishing the links between associated processing units and memory banks, wherein a plurality of communication paths for information input and output are provided in the input and output circuits.

The construction details of the elemental units of such a system are described in U.S. Pat. No. 3,792,439. The block diagram of the system proposed herein illustrates in FIG. 1 the processing units VE with their own operating sequence controls governed by wired instructions and/or instructions located in the storage unit. These processing units are similar to other processing units known in the art. The operating sequence controls are connected with a storage input/output control SEAS over information channels $a$ and control channels $b$. Access to the working storage takes place in cycles, that is to say, for each cycle to be allotted it is decided which processing units shall have access to the working storage. Since the working storage shall have a large capacity and a minimum cycle time it is made up of a number of memory banks SB, each of which combines the storage medium and the memory operation control into a logic functional unit. The construction of the memory is apparent from FIGS. 4$a$ and 4$b$ of the U.S. Pat. No. 3,792,439 and from the description therein. These memory banks are likewise connected with the storage input/output control SEAS over information channels $a$ and control channels $b$. The storage input/output control SEAS comprises an input circuit ES to which the information lines $a$ leading to the processing units VE and memory banks SB are connected and by means of which the storage word address, the operation code and the storage word are read into the storage. The paths between the various processing units VE and memory banks SB in the input circuit ES are switched by the input control EAS which is connected with the processing units VE and memory banks SB over control lines $b$. The signals for the cycle request, the special priority and the memory bank address are transmitted over the control lines $b$ between the processing units and the input control EAS. The information output takes place over an output circuit AS which is likewise connected with the memory banks SB and the processing units VE over information lines $a$. The paths in the output circuit AS are switched by the output control AAS which causes, among other things, the transfer of the storage output report to the processing units over control lines. Input control EAS and output control AAS are connected by a register R in which the condition of the memory banks SB, that is to say, the coordination between processing units VE and memory banks SB is stored. The storage input/output control SEAS now has the task of selecting the processing valve VE requesting storage cycles and the memory banks SB making output requests dependent upon the priority thereof.

In the proposed storage input/output control SEAS it is possible to run several memory bank cycles concurrently, whereby the effective cycle time of each memory bank equals a whole multiple of the processing time of the storage input/output control. This processing time of the storage input/output control SEAS will hereinafter be referred to as an operating interval.

The shorter this operating interval, the more memory bank cycles can be initiated by the storage input/output control SEAS within a given period of time. Four parallel information paths are constructed both in the input circuit ES and in the output circuit AS of the storage input/output control SEAS for connecting the processing units to the memory banks and the memory banks to the processing units, respectively. These paths can be used by individual processing units and memory banks or by pairs of processing units or pairs of memory banks if identical processing units or memory banks operate in a parallel mode. These parallel information paths are shown in FIG. 6 of U.S. Pat. No. 3,792,439 and in the input circuit (ES) shown in FIG. 2 herein as paths PA, PB, PC and PD. The processing units and the memory banks are each combined into four groups in accordance with the number of parallel information paths through the storage input/output control for the processing of the storage cycle requests of the processing units VE or output requests of the memory banks SB and for the associated switching of the information. The groups of the processing units VE and of the memory banks SB are connected both in the input and output circuit by a space-division circuit (four parallel paths). The above arrangement for grouping the processing units VE and the memory banks SB is shown in U.S. Pat. No. 3,792,439. A central comparator is assigned to every two of these groups of processing units in the input circuit and every two of these groups of memory banks in the output circuit. These central comparators enable the processing units and/or the memory banks to operate in the parallel mode. The operation of these central comparators is in accordance with the operating interval of the storage input/output control. During this interval, only one comparison process is possible for a given pair of parallel processing units or memory banks. Thus, the operation of these common comparators is staggered in time and concurrent demands made by the processing units and/or memory banks of these common comparators are processed in succession. In this way the storage input/output control can be operated in each successive case with increased reliability and without cross-connecting of individual comparators assigned to the processing units or memory banks. Parallel operation of processing units is possible between the groups A and B (A1-B1, A2-B2, A3-B3, A4-B4) and between the groups C and D (C1-D1, C2-D2, C3-D3, C4-D4), parallel operation of memory banks between the groups W and X (W1-X1, W2-X2, W3-X3, W4-X4), and between the groups Y and Z (Y1-Z1, Y2-Z2, Y3-Z3, Y4-Z4). An example of the structural details of the information input circuit ES is shown in FIG. 6 of the U.S. Pat. No. 3,792,439.

As shown by U.S. Pat. No. 3,792,439, it is well known to select various processing units VE or memory banks SB for connection consideration being given to their order of preference and destination. However, under these prior known systems, if input requests from processing units and/or several output requests from memory banks are made upon previously known storage input/output control systems concurrently, this storage input/output control operates inefficiently, that is to say, it operates at an excessively low operating speed. One object of the invention is to modify these previously known storage input/output control systems such that a higher operating speed is achieved.

SUMMARY OF THE INVENTION

In accordance with the invention, the foregoing and other objects are achieved by combining the system units (i.e., processing units, memory banks) into several groups, their number being equal to the number of concurrently seizable paths between the processing units. The input or output requests of these system units are evaluated in the input or output control in dependence upon the order of preference of the system units and are compared in relation to their respective destinations. As a function of this evaluation and this comparison a plurality of processing units requesting an input and memory banks requesting an output are selected concurrently and switched to their respective destinations over the multiple paths in the input or output circuit.

The existing space-division circuit of the groups of processing units and memory banks is now utilized efficiently. If requests come in concurrently several processing units or memory banks are selected, consideration being given to their degree of priority and their destination, their information being simultaneously switched by the storage input/output control SEAS.

Accordingly to an embodiment of the invention, the system units are first selected according to the order of preference of the processing units within each group (decreasing priority from A1 over A2 to A3 and A4); one system unit (VE or SB) is selected for each group. Subsequently, the destinations of the selected system units are compared and the system units proceeding to the same destination are separated according to priorities of the groups (decreasing priority from A over B to C and D). In the case of parallel operation of system units two groups of system units at a time are combined into a single group. To do this, two identical system units having an identical destination are ascertained in an input or output time interval. The comparison with regard to the identity of destination of the two systems which follows during the independent operation of processing units is dropped. The comparison whereby system units are excluded is only carried out with selection data of the other groups of system units which, under certain circumstances, do not operate in a parallel mode.

Of still greater advantage is another embodiment, wherein the input or outpur control comprises selecting circuits whose number equals the number of existing groups of processing units or memory banks so that one selecting circuit is assigned to every group of destinations in which the request from system units of all priorities are evaluated and the system unit with the highest-ranking request is selected.

After the selection of a system unit by a selecting circuit, the input or output control inhibits all the system units of the same group having a lower order of preference and releases the destination groups of these system units for other groups of system units. This insures that in every selection process the best possible selection result for a multiple switching circuit is obtained. In the case of parallel operation of processing units and/or memory banks the system units to be switched are selected as a function of the priority of the pairs of terminals of parallel operating system units, that is to say, of the system unit having a higher priority and of the terminals of independently operating system units. System units capable of being connected in parallel are found in various groups of system units capable of being connected in parallel. They immediately succeed one another in their order of preference. A selected system unit inhibits not only all the system units having a lower priority in their own group and those having the selected destinations in the other groups, but also the identical system units of the other group connected in parallel to the inhibited system units of that group, whereby the other group again annuls its destination-selective inhibition for lower priorities. Thus, the utilization factor for the switchable paths in the storage input/output control in the case of a mixed independent mode or a parallel mode is increased.

It is of advantage to provide individual comparator circuits for handling the "cycle request" and "special priority" signals of processing units which are to be connected in parallel. Due to the immediate availability of such individual comparator circuits (in contradistinction to common comparator circuits) it is still possible, during the comparison error (fault signal detection) signalization of cycle request and special priority, to inhibit the parallel-connected processing units in the same input time interval as the selection, thereby preventing synchronous errors caused by varying selection results occurring in storage units which are operating in parallel.

BRIEF DESCRIPTION OF THE DRAWINGS

The principles of the invention will be more readily understood by reference to the description of a preferred embodiment given hereinbelow in conjunction with the drawings, wherein:

FIG. 3 is a schematic diagram of an input control EAS; and

FIG. 4 is a schematic diagram of an output control AAS.

DETAILED DESCRIPTION OF A PREFERRED EMBODIMENT

Figure 1:
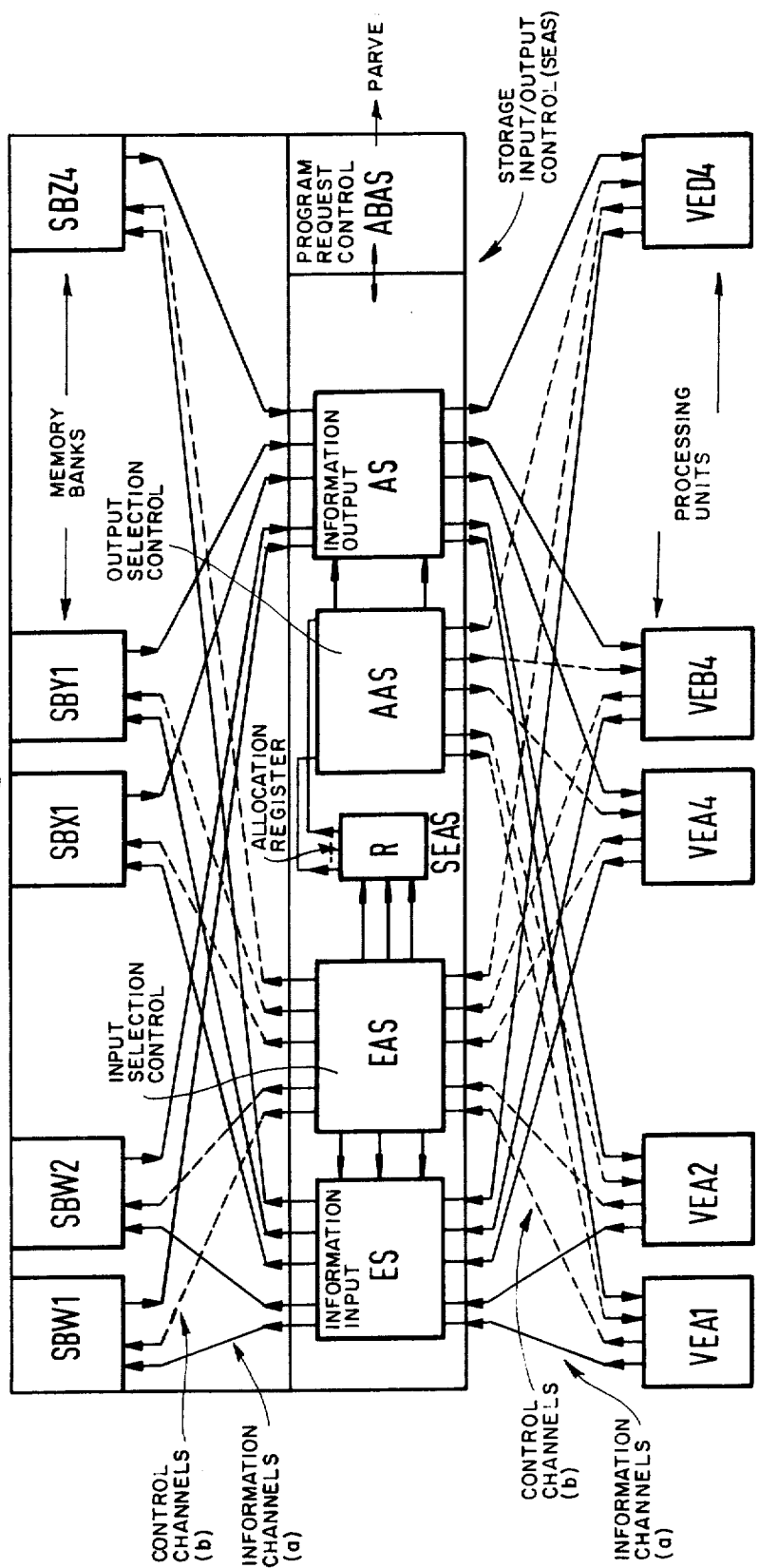
FIG. 1 is a schematic diagram of a program-controlled data processor constructed according to the invention.
Figure 2:
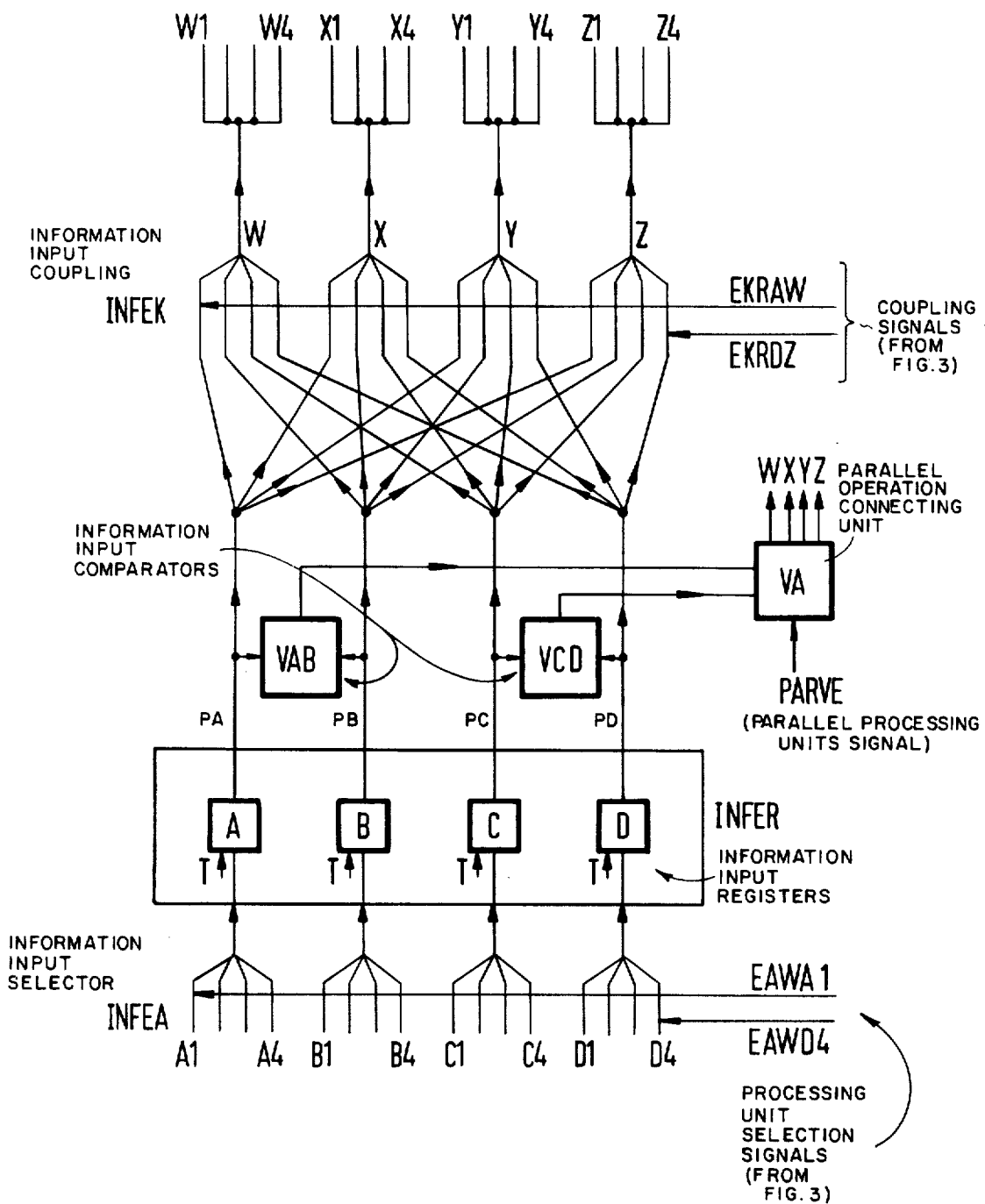
FIG. 2 is a schematic diagram of an input circuit ES.

The storage input/output control SEAS of a storage unit governs the traffic from the processing units VE to the memory banks SB of said storage unit and vice versa. The storage input/output control is composed of the main decision-making logic elements, information input, information output, input control and output control. FIG. 1 shows a block diagram of a storage input control with processing units and memory banks connected thereto. Due to internal parallel paths in the storage input/output control it is possible to select several processing units or memory banks concurrently, consideration being given to their priorities and destination requests during one operating interval, their information being switched during the succeeding operating interval. Four parallel information paths are possible both in the information input ES and in the information output AS for connecting the processing units to the memory banks and the memory banks to the processing units, respectively. These paths can be used by individual processing units and memory banks or by pairs of processing units or pairs of memory banks if the processing units or memory banks are operated in a parallel mode. For processing of the requests and the associated information switching, the processing units as well as the memory banks are permanently divided by the storage input/output control into four groups (groups A, B, C, abd D for the processing units and groups W, X, Y, and Z for the memory banks) in accordance with the 4 parallel paths, each of which comprises an information input and output. The modes of the processing-unit groups A B C D are fully intermeshed with the nodes of the memory bank groups WXYZ both in the input circuit ES and in the output circuit AS, thereby affording in the input circuit between processing-unit nodes and memory-bank nodes the following path possibilities, AW, AX, AY, AZ, BW, BX, BY, BZ, CW, CX, CY, CZ, DW, DX, DY, DZ; similarly, in the output circuit AS in a reverse direction the paths WA, WB, WC, WD, XA, XB, XC, XD, YA, YB, YC, YD, ZA, ZB, ZC, ZD are possible. Parallel operation of processing units is possible in processing units having the same index between the groups A and B, and likewise between the groups C and D. Parallel operation of memory banks in a storage unit is possible in memory banks having the same index between the groups W and X and between the groups Y and Z. The initiation of the parallel operation of two processing units or of two memory banks is possible by setting bits in the program request register of the program request control ABAS (FIG. 1). A common comparator (information input comparator VAB, VCD in FIG. 2) and information output comparator VWX and VYZ (not shown in the drawings but similarly connected in an output circuit AS which connects the memory banks to the processing units in precisely the same manner as the input circuit shown in FIG. 2 connects the processing units to the memory banks; the information output comparators VWX and VYZ are connected to the memory banks in the same manner as the information input comparators VAB and VCD in FIG. 2 are connected to the processing units), is allocated to the parallel-connected paths in the storage input/output control SEAS to supervise the parallel operation, and an individual comparator (V1-V16) is assigned to each pair of processing units for cycle requests (V9-V16) and special priorities (V1-V8). If a comparison fault is signalled at the time of a cycle request for special priority to the processing units, the two processing units used for the selection are inhibited during that input time interval, thereby preventing the occurrence of synchronous faults caused by varying selection results from parallel-operating storage units. A read command signal is supplied to the memory bank upon indication of a comparison error in the information paths A-B, C-D. During the readout from the memory bank it is to be expected that in case of error, in addition to the signalling of a comparison error, a fault message will arrive at one of the two parallel-operating memory banks indicating that the error is occasioned, for example, by the parity check, thereby ruling out the false information and allowing the correct information to be supplied to the processing unit.

The operation of the overall system is synchronized by a clock pulse. The working or operating interval of the storage input/output control is defined by the spacing between two clock pulses, that is, the clock pulse period. During every operating interval of the storage input/output control the following operations take place: input selection process EAW, input process E (EK and EZ), output selection process AAW and output process A (AK and AZ), all of which will be described hereinbelow by reference to the structure shown in the accompanying drawings.

The storage input/output control SEAS executes during each operating interval a quadruple input selection in accordance with priorities of the cycle-requesting processing units VE, taking into consideration the distribution of traffic carried by the memory banks and the adherence to the output sequence for a processing unit at the time memory banks are changed. A cycle request from a processing unit is identified by the storage cycle request device SZA over cycle request register SZAR, and the allotted memory bank address SBAD by which the memory bank in which the cycle shall be operated upon is designated over address register SBADR. Each processing unit has a normal priority (decreasing priority from A1 to D4) indicated by the connection number of the standard connection; and, in addition can be set for specified purposes to a special priority ranking higher than all normal priorities. Should several processing units make this special priority request SSP through special register SSPR concurrently, then the normal priority of the processing units is applicable to determine which processing unit receives special priority, that is, the processing unit having the highest normal priority is first taken into consideration. If a special priority is assigned to a processing unit, all the other processing units are excluded from the cycle allocation, whereas in the case of normal priority several processing units can be selected concurrently. The normal priority has its effect on the access available to a storage location addressed by several processing units and on the allocation of the nodes of the switching paths of the input circuit ES. Cycle requests made by processing units for connection to memory banks which are busy (i.e., memory banks currently operating on a storage cycle) are ignored until these memory banks are free, so that blocking is avoided). The information concerning the busy/idle condition of the memory banks is stored in register SBR in FIG. 3 for use by the input control unit of FIG. 3 in determining which memory banks are to be connected to processing units over the parallel information paths. In addition, a further cycle request made by a processing unit is not considered until after a first cycle request made by this processing unit starts in another memory bank. In this way, the sequence of input request made by a processing unit is invariably adhered to during the associated readouts from the storage unit. For each selection process only one processing unit can be selected in each processing-unit group A B C D. The selected paths do not hamper one another because of the input circuits ES; that is each memory bank node must be accessed from one processing-unit node only (exception: parallel operation of processing units). For each input selection process EQW the storage input/output control takes over the requests of the processing units in registers SZAR, SSPR, SBADR and produces therefrom the input selection data stored as follows: input selection data in register EAWR (i.e., which processing units), input coupling data in register EKR (i.e., from which processing-unit nodes to which memory-bank nodes), and input destination data in register EZR (i.e., to which memory banks), Moreover, the units of information of the processing units determined by the input selection are selected and switched to the input of the information input register INFER. Units of information should be understood to comprise all data and control signals required for the cycle processing in the memory banks SB or in the program request control ABAS. Storage cycle acknowledgement signals, stored in request register SZQR (FIG. 3) are applied to the processing units determined by the input selection signals EAW, whereupon the processing units withdraw their cycle requests. For each input process the criteria produced by the input selection process during the preceding operating interval are stored in registers shown in FIG. 3: input selection register EAWR, input coupling register EKR, input destination register EZR; and FIG. 2: information input register INFER. From the content of the input destination register EZR storage input messages signals SEM are provided, whereupon the corresponding memory banks start their storage cycles at the beginning of the next operating interval. The units of information required therefor are provided under the control of the information input registers INFER by the input coupling register EKR, distributed among the corresponding memory-bank groups — in each case parallel to the four memory banks of a group — by the information input message. During the input process the input data are interpreted by the storage input/output control e.g., interpretation of comparators in the case of parallel operation of processing units PARVE, connected through connecting unit VA (FIG. 2).

Standard interface signals are provided by storage cycle request means SZA, storage special priority means SSP and memory bank address means SBAD from the processing units through the appropriate register (FIG. 3) as input selection criteria. The memory bank address serves to prepare the input selection path parameters. If the memory bank addressed by a processing unit is busy, the input selection path parameters for this processing unit are inhibited, so that this processing unit is not taken into consideration in the quadruplex input selection logic AWL1. Furthermore, a processing unit is not taken into consideration until it is admitted for the purposes of cycle selection, which requires a prior acceptance of a storage cycle request for this processing unit. This cycle request can be inhibited by the special priority logic SPL (which determines that another processing unit is in the special priority condition, thereby inhibiting all other processing units), during the response of storage cycle request comparators V1 to V8 (FIG. 3) in parallel-running processing units, and during the change of memory banks of a processing unit until the output of the previous cycle has taken place. After a processing unit has been accepted for cycle selection, and if path parameters are available therefore, this processing unit participates in the quadruplex input selection for seizing paths in the input circuit ES. A maximum of four units can be determined per operating interval for the input selection; also, a maximum of four memory banks can be given associated input destinations by logic EZ. The path seizure between the processing-unit nodes and the memory-bank nodes of the input circuit ES is determined by the input coupling signals of register EKR. At the start of the next operating interval, input selection EAW, input coupling data EK and input destination EZ are transferred to registers EAWR, EKR, EZR respectively. The parallel information paths in the input circuit ES are controlled by the output signals of these three registers. Input selector register EAWR and input coupling register EKR control the paths of the input circit ES. The input selection register EAWR controls the information input selector INFEA and the input coupling register EKR controls the information input coupler INFEK. In the manner shown in FIGS. 2 and 6 of U.S. Pat. No. 3,792,439, these registers control gate circuits in the input circuit ES for connecting the paths between the processing units VE and the memory banks SB. The storage input message derived from the content of the input destination register EZR causes the affected memory bank to start its cycle with a transfer of information from the storage input/output control. A memory bank intended as input destination is noted as busy in the memory bank reservation register SBR. The following input selection processes are controlled based on the seized register data stored in the memory bank reservation register SBR. Moreover, a step counter SZ (not shown in the drawings) is allocated to each memory bank and disposed in the storage input/output control SEAS for the purpose of determining access time and cycle duration. The step counter SZ is started when a cycle request is made for the memory bank associated with the step counter. The step counter controls the memory bank during the transfer of information to the processing unit. Thus, even in the event of a failure in a memory bank, because of the location of the step counter, the storage input/output control continues to function. At the end of the access time, a storage output request for the output selection control AAS is formed; upon the completion of the cycle duration the reservation register SBR again reports that the corresponding memory bank is idle and can therefore be seized again when there are requests in the input control EAS.

The actual selection is produced in the input control EAS by means of the special priority logic SPL, the cycle request inhibiting logic ZAL, the circuit for producing the input selection path parameters ZE and the quadruplex input selecting logic AWL1 (FIG. 1). These circuits, the operation of which is described below, carry out either of two possible methods. In the first method the selection at first takes place according to priorities of the processing units in each group (in order of decreasing priority A1,A2, ... D4). One processing unit is selected from each group of processing units. Subsequently the destinations of the selected processing units are compared. This is possible, because the processing units initially supply their associated memory bank address along with their cycle request. Thereafter, the processing units desiring to proceed to the same destination are separated according to priorities of the groups (decreasing priority A B C D). In the case of processing units working in the parallel mode, two of these groups of processing units are combined each time into one group. For example, groups A and B with four processing units each may be combined into a single parallel group of eight processing units which utilizes only the parallel paths PA and PB in the input circuit ES. In one input time interval two identical processing units with identical destinations are then ascertained. No comparison with regard to the identity of destination of the two processing units which follows in the course of the independent distribution of processing units is required. The comparison with exclusion of processing units is solely carried out with selection results of the remaining groups of processing units operated, where necessary, in a non-parallel mode.

Apparatus is also provided for accomplishing a second method wherein the selection of the destination takes place according to the priorities of the processing units. This proceeds on the assumption that the connection sequence proceeds according to decreasing priorities (A1 to D4) of the processing units and the destination group (memory-bank group W X Y Z) of an idle bank is indicated according to priority, that all priorities are separately evaluated in four selection circuits (each time one per destination group). That yields a maximum of four selection results for four groups of memory banks. The condition that for each processing unit group A,B,C or D only one processing unit may be selected is met if after the selection of a processing unit all lower ranking processing units of the same group of processing units are inhibited. As a result of the lockout, the destination groups thereof are subsequently released to other groups of processing units. In the case of processing units operating in a parallel mode, independently operated processing units are selected in dependence upon the priority of the pair of connection-numbers of parallel-running processing units, that is to say, upon the priority of the higher ranking processing unit and of the connection number of independently operated processing units, the shuntable processing units being disposed in various shuntable groups of processing units (E.g., A-B, C-D); shuntable processing units follow one another in priority (governed by the priorities A1,B1,C1,D1, . . . D4). Independent processing units are selected in the manner described hereinabove. Thereafter, they inhibit not only all lower ranking processing units of their own group and destination-selectively those of the other group, but also the identical processing units of the other group connected in parallel with the inhibited processing units of a group, said other group again annulling its destination-selective lock-out for lower priorities. In other words, they then inhibit all processing units of their own group having a lower priority; thus, for example, the processing unit A1 inhibits the processing units A2,A3 and A4. Furthermore, the processing unit A1 inhibits destination-selectively, thus, for example, relative to the memory-bank group X all processing units B1,C1,D1 to D4. Then, for example, also the processing unit B2 connected in parallel with the inhibited processing unit A2 and which shall seize the memory-bank group Y, for example, is finally inhibited. In this way, the destination-selective lock-out, that is to say, the lock-out relative to the memory-bank group Y is annulled by the processing unit B2 for all processing units with a lower priority; thus, the memory-bank group Y can, for example, be seized from the processing C2.

The essential elements of the input control EAS for carrying out the multiple selection are the logic complexes SPL, ZAL, AWL1, EAW, EK and EZ. These logic circuits are made up of gates; their construction readily follows from the functions to be performed by them. Hence, the structural details of these logic circuits are not indicated herein. The functions performed by these logic circuits are described in detail below.

The special priority schemes of the processing units stored in the storage special priority register SSPR are routed to the special priority logic SPL. The special priority selection logic SPL carries out a selection of the special priority schemes according to normal priority of the processing units. Only one processing unit is admitted to the storage special priority condition. The results of the special priority selection still fit into the input selection processing during the same operating interval due to the cycle request inhibiting logic ZAL. This is accomplished by the fact tha the special priority intermediate selection data are evaluated in the cycle request inhibiting logic ZAL in conjunction with a collective report so that there actually exists a special priority.

The request configuration in the storage cycle request register SZAR for each operating interval serves as an output criterion for the input selection taking place during this operating interval. The cycle requests can be inhibited in the cycle request disabling logic ZAL by several conditions before they fit into the quadruplex input selection logic AWL1 as "storage cycle request for the input selection admitted." These inhibiting conditions are: If a processing unit changes the memory bank address, the processing of the cycle request is cancelled until the output of the preceding cycle has taken place. In this way, it is achieved, even if the memory-bank cycle times are different, that during the output from the storage unit the sequence of the input is adhered to. If a processing unit is in the special priority condition, the cycle requests of all the other processing units are inhibited. The cycle request inhibiting logic ZAL obtains the reports concerning the special priority condition from the special priority logic SPL. If the condition for parallel operation for a pair of the processing units is fulfilled, then in case of non-identity of the storage cycle requests or of the storage special priority, which is ascertained by the comparators V1 to V16, the two parallel-running processing units are locked out from the cycle allocation. All cycle requests to which these lock-out conditions are not applicable are then transferred from the cycle request inhibiting logic ZAL to the quadruplex input selection logic AWL1 as "storage cycle request for the input selection admitted."

The memory-bank address accompanying each cycle request of a processing unit is stored in the memory-bank address register SBADR. To produce the input selection path parameters utilizing selection path logic ZE the content of the memory bank address register SBADR is first decoded in the circuit ZE for each processing unit with a view to producing the input selection path parameters. The decoding allocates the memory bank addressed to the various memory-bank standard connection numbers of the storage input/output control. The resulting data from the memory bank address decoding serves as a means for producing the input selection path parameters. The input selection path parameters are divided into two signal groups: The input selection path parameters of the first order indicates to which group of memory banks the processing units concerned want to proceed: the input selection path parameters of the second order indicate to which memory bank in the memory bank group called on by the path parameters of the first order the processing unit concerned wants to proceed. The input selection path parameters of the first order serve as criteria for the quadruplex input selecting logic AWL1; the input selection path parameters of the second order are needed for obtaining the input destination after the quadruplex input selection has taken place. Thus, only the path parameters of the first order are a decisive factor for taking into consideration a processing unit in the quadruplex input selecting logic AWL1, since the quadruplex input selecting logic AWL1 only takes into consideration the response time or duration of the nodal points of the information input paths in the input circuits ES.

The quadruplex input selecting logic AWL1 evaluates the criteria "cycle request for the input selection admitted" and the input selection path parameters of the first order. Moreover, the signal PARVE emitted from the program request control ABAS is taken into consideration, which signal represents the parallel-operation condition of two processing units and determines whether the processing units forming a pair of processing units due to the standard numbering scheme of the processing units on the storage input/output control are to be selected as a parallel operating synchronously pair of processing units or as two independently operating processing units. A prerequisite for this consideration in the case of quadruplex input selection for a processing unit is that it is admitted to the input selection with its cycle request and has an input selection path parameter of the first order. These two conditions are requisite conditions both for the selection of the relevant processing unit itself and for inhibiting the selection of other processing units. The quadruplex input selecting logic AWL1 selects according to normal priorities of the processing units. The normal priorities are ordered decreasingly from A1,B1 to D4. These priorities are operative in the access to a given destination and in the seizing of paths in the input circuit ES of the storage input/output control SEAS. However, as a rule a processing unit only has an inhibiting effect due to its priority on the seizing of paths if itself it is not disabled by processing units with higher priorities.

A distinction must be made between general lock-out and destination-selective lock-out. General lock-out means making a lock-out independent of the desired destination, that is to say, all the memory bank nodes are generally disabled for access by a processing unit, the memory bank node being the common connecting point of the memory banks W or X or Y or Z in the input circuit ES (FIG. 2). Destination-selective lock-out, on the other hand, is a lock-out relative to a memory bank node. If memory banks are operated in the parallel mode, the destination-selective lock-out takes place with respect to two parallel memory bank nodes.

The function of the quadruplex input selecting logic and, hence, the construction of the circuit for executing this logic by means of gates follows from the functional description hereinbelow. The processing unit A1 is disabled by no other processing unit. The processing unit B1 is inhibited destination selectively by the processing unit A1, if the condition AB1 for parallel operation is not fulfilled. The destination-selective lockout takes place with respect to the adjacent memory bank node. The processing unit C1 is disabled destination-selectively by the processing units A1 and B1. To simplify the circuit design, in case the condition AB1 for parallel operation is fulfilled, the disabling effect of the processing unit A1 is annulled. In this case, the lockout only takes place through the processing unit B1. The selective lockout with regard to destination is extended to the adjacent parallel memory bank node, if the processing unit C1 has input selection path parameters of the first order for the disabled memory bank node and the memory bank node running parallel therewith. The processing unit D1 is disabled selectively with regard to destination by the processing units A1, B1 and C1, but by the processing unit C1 only if the parallel-operation condition CB1 is not satisfied. To simplify the circuit design in case the parallel-operation condition AB1 is fulfilled, the lockout effect of the processing unit A1 is annulled. In this case, the lockout takes place through the processing unit B1 only. The selective lockout with regard to destination is extended to the adjacent parallel memory bank node if the processing unit B1 has input selection path parameters of the first order for the disabled memory bank node and the memory bank node running parallel therewith. The processing unit A2 is generally inhibited by the processing unit A1 and if the parallel-operation condition AB2 is fulfilled also by the processing unit B1. It is inhibited selectively by the processing units A1, B1, C1 and D1 with respect to destination. The selective lockout with regard to destination is extended to the adjacent parallel memory bank node if the processing unit A2 has input selection path parameters of the first order for the disabled memory bank node and the memory bank node running parallel therewith. The processing unit B2 is disabled generally by the processing unit B1 and, if the parallel-operation condition AB2 is also satisfied, also by the processing unit A1. It is disabled selectively by the processing units A1, B1, C1, D1, and A2 with respect to destination. The disabling effect of the processing unit A2 is annulled if the processing unit A2 is generally disabled or the parallel-operation condition AB2 is fulfilled. The selective lockout with regard to destination is extended to the adjacent parallel memory bank node if the processing unit B2 has input selection path parameters of the first order for the disabled memory bank node and the one running parallel therewith. The processing unit C2 is generally disabled by the processing unit C1 and, if the parallel-operation condition CD2 is also satisfied, by the processing unit D1. It is disabled selectively by the processing units A1, B1, C1, D1, A2 and B2 with regard to destination. The disabling effect of the processing units A2 or B2 is annulled if the processing units A2 or B2 are inhibited generally. For reasons of circuit design, if the parallel-operation condition AB2 is satisfied, the lockout effect of A2 is annulled. The lockout, in this case, takes place through the processing unit B2 only. The selective lockout with respect to destination is extended to the adjacent parallel memory bank node, if the processing unit C2 has input selection path parameters of the first order for the disabled memory bank node and the one running parallel therewith. The processing unit D2 is generally disabled by the processing unit D1 and, if the parallel-operation condition CD2 is fulfilled, also by the processing unit C1. It is selectively inhibited by the processing units A1, B1, C1, D1, A2, B2, and C2 with respect to destination. The lockout effect of the processing unit A2 and B2 or C2 is annulled if the processing units A2 or B2 or C2 are disabled generally by the processing unit C2 and likewise if the parallel-operation condition CD2 is satisfied. To simplify the circuit design, in case the parallel-operation condition AB2 is satisfied, the lockout effect of the processing unit A2 is annulled. In this case, the lockout occurs only through the processing unit B2. The selective lockout with respect to destination is extended to the neighboring memory bank node if the processing unit D2 has input selection path parameters of the first order for the disabled bank node and the one running parallel therewith. The processing unit A3 is generally disabled by the processing units A1 and A2 and in case the parallel-operation condition AB3 is fulfilled also by the processing units B1 and B2. It is disabled selectively with regard to destination by the processing units A1, B1, C1, D1, A2, B2, C2 and D2. The selective lockout with regard to destination is extended to the neighboring parallel memory bank node if the processing unit A2 has input selection path parameters of the first order for the disabled memory bank node and the one running parallel therewith. The processing unit B3 is disabled generally by the processing units B1 and B2 and in case the parallel-operation condition AB3 is satisfied also by the processing units A1 and A2. It is disabled selectively with regard to destination by the processing units A1, B1, C1, D1, A2, B2, C2, D2, and A3. The lockout effect of the processing unit A3 is annulled if the processing unit A3 is generally disabled or the parallel-operation condition AB3 is fulfilled. The selective lockout with regard to destination is extended to the neighboring parallel memory bank node if the processing unit B3 has input selection path parameters of the first order for the disabled memory bank node and the one running parallel therewith. The processing unit C3 is generally disabled by the processing units C1 and C2 and if the parallel-operation condition CD3 is fulfilled also by the processing units D1 and D2. It is disabled selectively with regard to destination from the processing units A1, B1, C1, D1, A2, B2, C2, D2, A3, and B3. The lockout effect of the processing units A3 or B3 is annulled if the processing units A3 or B3 are disabled generally. To simplify the circuit design, in case the parallel-operation condition AB3 is fulfilled, the lockout effect of the processing unit A3 is annulled. The lockout, in this case, occurs only through the processing unit B3. The selective lockout with regard to destination is extended to the neighboring parallel memory bank node if the processing unit C3 has input selection parameters of the first order for the disabled memory bank node and the one running parallel therewith. The processing unit D3 is generally disabled by the processing units D1 and D2 and if the parallel-operation condition CD3 is satisfied also by the processing units C1 and C2. It is disabled selectively with regard to destination by the processing units A1, B1, C1, D1, A2, B2, C2, D2, A3, B3, C3. The lockout effect of the processing units A3 or B3 or C3 is annulled if the processing units A3 or B3 or C3 are disabled generally by the processing unit C3, also if the parallel-operation conditing CD3 is satisfied. To simplify the circuit design, in case the parallel-operation condition AB3 is satisfied, the disabling effect of the processing unit A3 is annulled. In this case, the lockout occurs only through the processing unit C3. The selective lockout with respect to destination is extended to the neighboring parallel memory bank node if the processing unit D3 has input selection path parameters of the first order for the disabled memory bank node and the one running prallel therewith. The processing unit A4 is generally disabled by the processing units A1, A2 and A3 and if the parallel-operation condition AB4 is satisfied also by the processing units B1, B2 and B3. It is disabled selectively with respect to destination by the processing units A1, B1, C1, D1, A2, B2, C2, D2, A3, B3, C3 and D3. The selective lockout with respect to destination is extended to the neighboring parallel memory bank node if the processing unit A4 has input selection path parameters of the first order for the disabled memory bank node and the one running parallel therewith. The processing unit B4 is generally disabled by the processing unit B1, B2, and B3 and in case the parallel-operation condition is fulfilled also by the processing units A1, A2 and A3. It is disabled selectively with regard to destination from the processing units A1, B1, C1, D1, A2, B2, C2, D2, A3, B3, C3, D3, and A4. The lockout effect of the processing unit A4 is annulled if the processing unit A4 is generally disabled or if the parallel-operation condition AB4 is satisfied. The selective lockout with respect to destination is extended to the neighboring parallel memory bank node if the processing unit B4 has input selection path parameters of the first order for the disabled memory bank node and the one running parallel therewith. The processing unit C4 is generally disabled by the processing units C1, C2 and C3 and if the condition for parallel operation CD4 is satisfied also by the processing units D1, D2, and D3. It is disabled selectively with regard to destination by the processing units A1, B1, C1, A2, B2, C2, D2, A3, B3, C3, D3, A4 and B4. The lockout effect of the processing unit A4 or B4 is annulled if the processing units A4 or B4 are generally disabled. To simplify the circuit design, in case the parallel-operation condition AB4 is satisfied, the lockout effect of the processing unit A4 is annulled. The lockout occurs in this case solely through the processing unit B4. The selective lockout with regard to destination is extended to the neighboring parallel memory bank node if the processing unit C4 has input selection path parameters of the first order for the disabled memory bank node and the one running parallel therewith. The processing unit D4 is generally disabled by the processing units D1, D2, D3 and if the parallel-operation condition CD4 is satisfied also by the processing units C1, C2 and C3. It is disabled selectively with regard to destination from the processing units A1, B1, C1, D1, A2, B2, C2, D2, A3, B3, C3, D3, A4, B4 and C4. The lockout effect of the processing unit A4 or B4 or C4 is annulled if the processing units A4 or B4 or C4 are disabled generally, and also by C4 if the parallel-operation condition CD4 is fulfilled. To simplify the circuit design, in case the condition for parallel operation AB4 is fulfilled, the lockout effect of the processing unit A4 is annulled. In this case, the lockout occurs solely through the processing unit B4. The selective lockout with regard to destination is extended to the neighboring parallel memory bank node if the processing unit D4 has input selection path parameters of the first order for the disabled memory bank node and the one running parallel therewith.

At the outlets of the quadruplex input selection logic AWL1 it is now indicated, for each operating interval, which processing unit seizes the information input paths in the input circuit ES in the course of the subsequent operating interval. The criteria input selection, input coupling and input destination are derived from the selection data of the quadruplex input selection logic AWL1. The criterion input selection is produced in the logic circuit EAW by merging the four possible path data per processing unit. That means that for each input selection process the maximum four of the sixteen existing processing units which can have a path result can be admitted for the input selection. The criterion input coupling is formed in the logic circuit EK by merging the path data leading to one of the sixteen existing paths. The criterion input destination arises in the logic circuit EZ by combining the path data with the input selection path parameters of the second order. The three criterion are accepted into the corresponding registers EAWR, EKR and EZR.

Heretofore we have discussed the input selection process of the processing units by means of the input control EAS. We shall now describe briefly the output selection process of the memory banks in the output control AAS which takes a substantially similar course. Concurrently with the cycle operations in the memory banks, step counters assigned to the memory banks are started in the storage input/output control which determine vicariously the access and cycle time for the memory bank. In this way, the time response remains unchanged even if a memory bank fails, which is an absolute prerequisite for the synchronous operation of the storage units. Thus, the memory banks themselves cannot influence the time-dependent operations of the system. The input-output allocation, too, occurs in the storage input/output control. In an allocation register R (FIGS. 1 and 3) the processing unit for which the particular cycle is performed is retained for each memory bank. The output selection control AAS executes for each operating interval a quadruplex output selection according to the priorities of the memory banks. To do this, it takes as a basis the output requests SAF which at the instant of the access time are derived from the step counters in the storage input/output control representing the memory banks. Each memory bank has a normal priority (decreasing priority W1, X1, Y1, Z1, W2 . . . Z4) provided by the number of the standard terminal at the interface of the storage unit. Furthermore, a memory bank receives an output special priority if it is again designated by the input control EAS for a new cycle start. In the case of the output special priority, only the memory banks with an output special priority in the output selection for the output of its information to the information output register INFAR are controlled independently of the normal priority. This information register belongs to the output circuit AS which is not shown in the drawings herein. However, the output circuit AS is identical to the input circuit ES in that it connects the memory banks SB to the processing units VE in the same manner as the input circuit ES shown in FIG. 2 connects the processing units VE to the memory banks SB. An output special priority can have a maximum of four memory banks (one for each group of memory banks), since only four can be selected for input destination in the preceding input selection process. In this way, a temporary storage of information in the memory banks is avoided in which there is already an ongoing new cycle before the information of the proceding cycle could be delivered to the storage input/output control. However, an internal blocking may occur because several memory banks to be given preference through output special priority want an output connection to the same group of processing units. Since these outputs can be executed one after another and additional buffering of information is to be avoided, the input control EAS is disabled until the output special priority blocking is worked off. The internal blocking is worked out in such a manner that the information accepted a maximum of four times and simultaneously sent into the information register because of the output special priority is transferred to the procesing unit in successive operating intervals following the sequence of normal priorities of the memory banks. For each output selection process the output control AAS generates the output selection data output selection AAW, output coupling AK and output destination AZ. By means of the output selection AAW it is determined which memory bank may output its information. To achieve this purpose, a distinction is made between an output selection criterion AAW1 for controlling the transfer of information to the information output register in the output circuit AS and an output selection criterion AAW2 for controlling the output process from the output circuit AS to the processing unit. By means of the output coupling criterion AK the path is determined on which the information in the output circuit AS is transferred. That means that the output coupling determines from which memory-bank node to which processing-unit node the information is transferred. The output destination criterion AZ determines which processing units shall be reached. For each output process, the criteria generated in the course of the preceding operation interval are transferred to registers by the output selection process (FIG. 4: output selection register AAW1R, output coupling register AKR, output destination register AZR). The storage output messages SAM are made from the content of the output destination register AZR which fixes the processing units to be reached.

To produce the output selection path parameters the results of the input selection for each memory bank cycle are transferred to the allocation register R. The selective transfer to the section of the allocation register R corresponding to a memory bank is controlled by the input destination register EZR through clock pulse control of the corresponding section of the allocation register. Similar to the input selection path parameters, output selection path parameters of the first and second order are produced from the content of the allocation register R in the logic circuit ZA. The output selection path parameters of the first order serve as criteria for the quadruplex output selection logic AWL2. They indicate for each memory bank to which group of processing units the output shall take place after the output selection is completed. The output selection path parameters of the second order serve to obtain the output destination. They indicate for each memory bank to which processing unit in the groups called the parameters of the first order the output shall take place.

The storage output request logic SAL serves to control the storage output request register SAFR. If a storage output request SAF comes from the step counter of a memory bank, the corresponding bit of the storage request register SAFR is set with the clock pulse following thereafter. The storage request register SAFR is held in the set condition feedback over the storage output request logic SAL until the corresponding memory bank in the output selection logic AWL2 has been taken into consideration. The storage output request register SAFR is employed, among other things, to produce the output special priority condition for each memory bank, this is to say, to control the output special priority logic ASSP. A memory bank for which an output request in the storage output request register SAFR is recorded and which is simultaneously identified in the input destination register EZR of the input control EAS as input destination for a new cycle receives output special priority. This condition is employed in the output request inhibiting logic ASP and in the formation of the condition output selection in the output selection logic circuit AAW2. The storage output request register SAFR controls, moreover, the output request inhibiting logic ASP. By evaluating the condition output special priority the memory banks are excluded from the output selection in the quadruplex output selection logic AWL2 having no output special priority during the output special priority condition. As a result of this connection, the condition "output request for output selection admitted" serves as a criterion for the quadruplex output selection logic AWL2.

The quadruplex output selection logic AWL2 evaluates the criteria "output request for the output selection admitted " which are output from the output request inhibiting logic ASP, and output selection path parameters which are output from the logic circuit AZ. The quadruplex output selection logic AWL2 operates, if the processing units are replaced by memory banks, according to the same principles as the quadruplex input selection logic AWL1 as far as the circuit design is concerned. Hence, a detailed discussion of the quadruplex output selection logic is not necessary. The results of the quadruplex output selection logic AWL2 specify for each operating interval for which memory bank during the next operating interval a seizing of the information output paths in the output circuit AS is admitted. The criteria output selection AAW1, output coupling AK and output destination AZ are derived from the selection data of the quadruplex output selection logic AWL2. The criterion output selection AAW1 is obtained by merging the four selection data which are possible for each memory bank in the logic circuit AAW1, that is to say, for each output selection process the maximum for of the sixteen available memory banks having an output result are admitted for the output selection. The criterion output coupling AK is obtained by merging the path data leading to one of the sixteen available paths. This criterion is formed in the logic circuit AK. In the logic circuit AZ the criterion output destination AZ is formed by combining the selection data of the quadruplex output selection logic AWL2 with the output selection path parameters of the second order. These criteria are then transferred to the corresponding registers AZR, AKR, and AAW1R to control the memory bank output.

We claim:

1. A data processing switching system comprising a plurality of processing units, a plurality of memory banks, and a storage input/output control system governing the information traffic between said processing units and said memory banks, said storage input/output control system comprising an input circuit and an output circuit as well as an input control unit and an output control unit cooperating with said input and output circuits for establishing and controlling said information traffic over parallel information channels connecting said processing units and said memory banks via said input and output circuits, said input control unit being associated with said processing units said output control unit being associated with said memory banks, wherein each of said plurality of processing units (VE) is selectively assigned to one group of a plurality of processing groups and each of said plurality of memory banks (SB) is selectively assigned to one group of a plurality of memory groups, the number of groups in both said plurality of processing groups and said plurality of memory groups being equal to the number of parallel information channels simultaneously available to said input and output control units for establishing and controlling traffic between the processing units and the memory banks, each of said processing units within each of said plurality of processing groups having an assigned priority of the first order relative to the other processing units in the same group in said plurality of processing groups and each of said memory banks within each of said plurality of memory groups having an assigned priority of the first order relative to the other memory banks in the same group in said plurality of memory groups, and each group in said plurality of processing groups and each group in said plurality of memory groups having an assigned priority of the second order relative to the other groups in said plurality of processing groups and said plurality of memory groups, respectively, said plurality of processing units each including means for sending input requests to said input/output control system and said plurality of memory banks each including means for sending output requests to said input/output control system, said input control unit and said output control unit including means for evaluating said input and output requests, respectively, during each operating interval of the input/output control system according to the assigned priority of the plurality of processing units and plurality of memory banks, said input control unit and said output control unit each further including means for comparing said input and output requests on the basis of their respective memory bank and processing unit destinations, whereby said evaluating and comparing means enable said input/output control system during each operating interval to simultaneously connect information channels between one or more of said plurality of processing units requesting an input and one or more of said plurality of memory banks requesting an output and their respective destinations according to the assigned priority of said plurality of processing units and said plurality of memory banks, the number of possible simultaneous connections being equal to said number of parallel information channels simultaneously available to said input and output control units.

2. The data processing system as claimed in claim 1, wherein each of said plurality of processing units (VE) operates independently of other processing units in communicating with any of said plurality of memory banks, each of which operates independently of other memory banks, said input control unit (EAS) of said storage input/output control system further comprising:

means for selecting one processing unit from each group of said plurality of processing groups according to the assigned priority of said processing units within said group, said evaluating and comparing means of said input control unit (EAS) further comprising means for establishing information channels via said input circuit for the selected processing units according to the assigned priority of said plurality of processing groups, the destination of said processing units being indicated in the form of addresses, whereby an information channel is established for the selected processing unit assigned to the group having the highest priority whenever a plurality of said selected processing units requests the same destination.

3. The data processing system as claimed in claim 1, wherein said processing units are operating independently of other processing units in communicating with said memory banks, each of which are operating independently of other memory banks, said evaluating and comparing means in both said input control unit and said output control unit comprising a plurality of selecting circuits for determining the respective destinations of said input and output requests, the number of said selecting circuits being equal to the number of simultaneously available parallel information channels, whereby each of said plurality of selecting circuits in said input control unit is associated with a different group of said plurality of memory groups and each of said plurality of selecting circuits in said output control unit is associated with a different group of said plurality of processing groups, each one of said plurality of selecting circuits in said input control unit including means for evaluating and comparing the input requests of said plurality of processing units and selecting the one processing unit from among said plurality of processing units requesting the group of memory banks associated with selecting circuit having the highest assigned priority of said processing units, said selecting circuit enabling said input control unit to connect an information channel via said input circuit between said one selected processing unit and said group of memory banks associated with said selecting circuit, said input control unit further including means for preventing said input control unit from connecting an information channel between the other processing units in the same group of said plurality of processing groups as said one selected processing unit and any of said plurality of memory banks, whereby said preventing means enables other selecting circuits in said input control unit associated with different ones of said plurality of memory groups to select other processing units from among other groups of said plurality of processing groups.

4. The data processing system as claimed in claim 1, wherein each of said plurality of processing units (VE) operates independently of other processing units in communicating with any of said plurality of memory banks, each of which operates independently of other memory banks, said output control unit (AAS) of said storage input-/output control system further comprising:

means for selecting one memory bank from each group of said plurality of memory groups according to the assigned priority of said memory banks within said group, said evaluating and comparing means of said output control unit (AAS) further comprising means for establishing information channels via said output circuit for the selected memory banks according to the assigned priority of said plurality of memory groups, the destination of said memory banks being indicated in the form of addresses, whereby an information channel is established for the selected memory bank assigned to the group having the highest priority whenever a plurality of said selected memory banks requests the same destination.

5. The data processing system as claimed in claim 1, wherein said processing units are operating independently of other processing units in communicating with said memory banks, each of which are operating independently of other memory banks, said evaluating and comparing means in both said input control unit and said output control unit comprising a plurality of selecting circuits for determining the respective destinations of said input and output requests, the number of said selecting circuits being equal to the number of simultaneously available parallel information channels, whereby each of said plurality of selecting circuits in said input control unit is associated with a different group of said plurality of memory groups and each of said plurality of selecting circuits in said output control unit is associated with a different group of said plurality of processing groups, each one of said plurality of said selecting circuits in said output control unit including means for evaluating and comparing the output requests of said plurality of memory banks and selecting the one memory bank from among said plurality of memory banks requesting the group of processing units associated with said selecting circuit having the highest assigned priority of said memory banks, said selecting circuit enabling said output control unit to connect an information channel via said output circuit between said one selected memory bank and said group of processing units associated with said selecting circuit, said output control unit further including means for preventing said output control unit from connecting an information channel between the other memory banks in the same group of said plurality of memory groups as said one selected memory bank and any of said plurality of processing units, whereby said preventing means enables other selecting circuits in said output control unit associated with different ones of said plurality of processing groups to select other memory banks from among other groups of said plurality of memory groups.

6. The data processing system as claimed in claim 1, wherein at least two of said processing units are capable of being combined together in pairs for parallel operation, said processing units in each of said parallel pairs being located in different groups of said plurality of processing groups and having the same assigned first order priority within said different groups, the input requests of said processing units in each of said parallel pairs having the same memory bank destination, said input/output control system further comprising common comparator means connected to said information channels in said input circuit for comparing the input requests of said processing units and for combining together in pairs said processing units capable of parallel operation, wherein said evaluating and comparing means of said input control unit evaluates said input requests of said parallel pairs of processing units according to the highest assigned priority of said processing units comprising said parallel pairs of processing units and compares said input requests of both said parallel pairs of processing units and the other processing units not combined together in said parallel pairs, whereby said common comparator means evokes said input/output control system to simultaneously connect one or more of said parallel pairs of processing units and said other processing units to their respective destinations, said input/output control system making said simultaneous connections according to the assigned priority of said parallel pairs of processing units and said other processing units.

7. The data processing system as defined in claim 6, wherein said evaluating and comparing means of said input control unit further comprises selecting means for selecting parallel pairs of said processing units and said other processing units making said input requests from among said plurality of processing units according to the highest assigned priority, said selected processing units being available for connection to their respective destinations, said selecting means comprising:

lock-out means for disabling said parallel pairs of processing units and said other processing units having a lower assigned priority than others of said plurality of processing units making input requests, said lock-out means operative to disable said parallel pairs of said processing units and said other processing units according to said first order of priority within the same group of said processing groups in the event more than one of said processing units in the same group make input requests and according to said first and second orders of priority in the event more than one of said processing units in different groups make input requests for the same memory banks destination, said lock-out means operative to disable each of said processing units combined together for parallel operation;

means cooperative with said lock-out means for annulling the disabling effect of said lock-out means between processing units combined together in pairs for parallel operation and between a first processing unit and a second processing unit in a different group of said plurality of processing groups, said first and second processing units having the same first order of priority, in the event said first processing unit is disabled by another processing unit in the same group of said plurality of processing groups as said first processing unit.

8. The data processing system as claimed in claim 6, wherein at least two of said memory banks are capable of being combined together in pairs for parallel operation, said memory banks in each of said parallel pairs being located in different groups of said plurality of memory groups and having the same assigned first order priority within said different groups, the output requests of said memory banks in each of said parallel pairs having the same processing unit destination, said input/output control system further comprising common comparator means connected to said information channels in said output circuit for comparing the output requests of said memory banks and for combining together in pairs said memory banks capable of parallel operation, wherein said evaluating and comparing means of said output control unit evaluates said output requests of said parallel pairs of memory banks according to the highest assigend priority of said memory banks comprising said parallel pairs of memory banks and compares said output requests of both said parallel pairs of memory banks and the other memory banks not combined together in said parallel pairs, whereby said common comparator means evokes said input/output control system to simultaneously connect one or more of said parallel pairs of memory banks and said other memory banks to their respective destinations, said input/output control system making said simultaneous connections according to the assigned priority of said parallel pairs of memory banks and said other memory banks.

9. The data processing system as defined in claim 8, wherein said evaluating and comparing means of said output control unit further comprises selecting means for selecting parallel pairs of said memory banks and said other memory banks making said output requests from among said plurality of memory banks according to the highest assigned priority, said selected memory banks being available for connection to their respective destinations, said selecting means comprising:

lock-out means for disabling said parallel pairs of memory banks and said other memory banks having a lower assigned priority than others of said plurality of memory banks making output requests, said lock-out means operative to disable said parallel pairs of said memory banks and said other memory banks according to said first order of priority within the same group of said memory groups in the event more than one of said memory banks in the same group make output requests and according to said first and second orders of priority in the event more than one of said memory banks in different groups make output requests for the same processing unit destination, said lock-out means operative to disable each of said memory banks combined together for parallel operation;

means cooperative with said lock-out means for annulling the disabling effect of said lock-out means between memory banks combined together in pairs for parallel operation and between a first memory bank and a second memory bank in a different group of said plurality of memory groups, said first and second memory banks having the same first order of priority, in the event said first memory bank is disabled by another memory bank in the same group of said plurality of memory group as said first memory bank.

10. The data processing system as defined in claim 6, wherein said input requests of said parallel pairs of processing units comprise cycle requests and special priority requests, said input control unit including individual comparator means (V1 to V16) connected to each pair of said parallel processing units receiving said cycle requests and said special priority requests, said individual comparator means detecting comparison errors in transmission of said cycle requests and said special priority requests of said parallel pairs of processing units and enabling said input control unit to disable said parallel pairs of processing units having said comparison errors, whereby said comparison errors detected by said individual comparison means occur in the event of a dissimilarity in the cycle requests and the special priority requests between the processing units comprising each pair of said parallel processing units.

11. The data processing system as defined in claim 6, wherein said common comparison means is operative to detect comparison errors in said input requests between the processing units comprising each pair of said parallel processing units and to enable said storage input/output control system to read the selected memory bank upon the occurrence of said comparison errors.

12. The data processing system as defined in claim 1, wherein said input requests of said plurality of processing units includes the addresses of the memory banks intended for connection over said information channels, said input control unit further comprising means for holding input requests to busy memory banks until said busy memory banks are again available for connection over said information channels.

13. The data processing system as defined in claim 1, wherein said evaluating and comparing means of said output control units gives special priority to the output requests of the memory banks connected over said information channels by said input control unit during the preceeding operating interval.

* * * * *